US011999600B2

(12) United States Patent
Struck et al.

(10) Patent No.: US 11,999,600 B2
(45) Date of Patent: Jun. 4, 2024

(54) LIFTING GEAR

(71) Applicant: COLUMBUS MCKINNON INDUSTRIAL PRODUCTS GMBH, Wuppertal (DE)

(72) Inventors: Detlef Struck, Wuppertal (DE); Wolfram Schneebeck, Wuppertal (DE)

(73) Assignee: COLUMBUS MCKINNON INDUSTRIAL PRODUCTS GMBH, Wuppertal (DE)

( * ) Notice: Subject to any disclaimer, the term of this patent is extended or adjusted under 35 U.S.C. 154(b) by 320 days.

(21) Appl. No.: 17/629,069

(22) PCT Filed: Feb. 13, 2020

(86) PCT No.: PCT/DE2020/100100
§ 371 (c)(1),
(2) Date: Jan. 21, 2022

(87) PCT Pub. No.: WO2021/013285
PCT Pub. Date: Jan. 28, 2021

(65) Prior Publication Data
US 2022/0274813 A1 Sep. 1, 2022

(30) Foreign Application Priority Data
Jul. 24, 2019 (DE) ..................... 10 2019 120 036.9

(51) Int. Cl.
*B66D 1/06* (2006.01)
*B66D 3/14* (2006.01)
(Continued)

(52) U.S. Cl.
CPC ................. *B66D 1/06* (2013.01); *B66D 3/14* (2013.01); *B66D 5/14* (2013.01); *B66D 5/34* (2013.01); *B66D 2700/05* (2013.01)

(58) Field of Classification Search
CPC ... B66D 1/04; B66D 1/06; B66D 1/14; B66D 1/16; B66D 1/20; B66D 1/28; B66D 1/30;
(Continued)

(56) References Cited

U.S. PATENT DOCUMENTS 2,670,176 A * 2/1954 Coffing .................... B66D 3/14 254/372
4,057,199 A * 11/1977 Scibbe .................... B60R 22/44 242/385.3
(Continued)

FOREIGN PATENT DOCUMENTS

CN 1071892 A 5/1993
CN 1340026 A 3/2002
(Continued)

OTHER PUBLICATIONS

International Search Report or Written Opinion of International Application No. PCT/DE2020/100101 dated Jun. 8, 2020; 21pp.
(Continued)

*Primary Examiner* — Michael R Mansen
*Assistant Examiner* — Henrix Soto
(74) *Attorney, Agent, or Firm* — HAUPTMAN HAM, LLP

(57) ABSTRACT

A lever hoist includes a housing in which a load chain wheel and a driveshaft driving the load chain wheel are mounted, as well as a safety brake. A load chain is movable via the load chain wheel. The safety brake brings about an emergency braking in the event of excessive rotational speed of the driveshaft. The safety brake has a locking disc with teeth and a control disc with control cams. The locking disc and the control disc are rotatable in relation to one another in a limited manner. A catch hook is movable in a swiveling manner and has a latch contour and a sensing contour. The
(Continued)

sensing contour rests on the control. In response to exceeding a defined rotational speed, the sensing contour lifts off the control disc. The latch contour rotates towards the locking disc and engages with a locking tooth of the locking disc.

20 Claims, 12 Drawing Sheets

(51) Int. Cl.

*B66D 5/14* (2006.01)

*B66D 5/34* (2006.01)

(58) Field of Classification Search

CPC .......... B66D 1/34; B66D 1/36; B66D 1/7452; B66D 1/7468; B66D 1/7463; B66D 3/02; B66D 3/14; B66D 5/14; B66D 5/34; B66D 2700/0116; B66D 2700/0183; B66D 2700/05

USPC .......................................................... 254/376

See application file for complete search history.

(56) References Cited

U.S. PATENT DOCUMENTS

| | | | | | |
|---|---|---|---|---|---|
| 4,058,271 | A | | 11/1977 | Ubukata et al. | |
| 4,265,415 | A | * | 5/1981 | Harrell | B60R 22/3416 242/384.7 |
| 4,274,620 | A | * | 6/1981 | Uher | B66D 1/72 254/351 |
| 4,480,802 | A | * | 11/1984 | Chang | A01K 89/0117 74/576 |
| 4,512,555 | A | | 4/1985 | Nakamura | |
| 4,520,998 | A | | 6/1985 | Flaig | |
| 4,708,303 | A | * | 11/1987 | Emura | A01K 89/057 242/300 |
| 4,824,045 | A | * | 4/1989 | Kawabe | A01K 89/0117 74/576 |
| 5,330,036 | A | | 7/1994 | Nishi et al. | |
| 5,421,553 | A | | 6/1995 | Hashiue | |
| 10,351,397 | B2 | | 7/2019 | Uebel | |
| 2002/0027222 | A1 | | 3/2002 | Struck | |
| 2022/0242704 | A1 | | 8/2022 | Struck et al. | |
| 2022/0274813 | A1 | | 9/2022 | Struck et al. | |

FOREIGN PATENT DOCUMENTS

| | | | | |
|---|---|---|---|---|
| CN | 208995037 | U | | 6/2019 |
| CN | 114174211 | A | | 3/2022 |
| DE | 3137523 | A1 | | 4/1983 |
| DE | 4105050 | A1 | | 8/1992 |
| DE | 10148408 | C1 | | 11/2002 |
| EP | 0279144 | B1 | | 10/1992 |
| EP | 3395746 | A1 | | 10/2018 |
| EP | 4003897 | A1 | | 6/2022 |
| GB | 684006 | A | | 12/1952 |
| GB | 1021552 | A | * | 3/1966 |
| JP | S6057979 | U | * | 4/1985 |
| JP | H06271290 | A | | 9/1994 |
| JP | H0718288 | Y2 | * | 5/1995 |
| JP | 2006241807 | A | * | 9/2006 |
| JP | 7232378 | B2 | | 3/2023 |
| WO | 2021013285 | A1 | | 1/2021 |

OTHER PUBLICATIONS

Office Action for Canadian Application No. 3153687 dated May 9, 2023; 4pp.

Office Action for Chinese Application No. 202080052755.X dated Feb. 3, 2023; 10pp.

* cited by examiner

LIFTING GEAR

RELATED APPLICATIONS

The present application is a National Phase of International Application Number PCT/DE2020/100100 filed Feb. 13, 2020 and claims priority of German Application Number 10 2019 120 036.9 filed Jul. 24, 2019.

FIELD

The disclosure relates to lifting gear, such as a lever hoist.

BACKGROUND

Lifting gear, such as a lever hoist, usually uses round steel chains as a support or traction device and is used for lifting, lowering and pulling loads. The lifting movement is able to be generated by manual operation, compressed air or an electric motor. The present disclosure relates to a hand-operated lever hoist.

A lever-operated lifting gear, which is also referred to as a pull stroke or chain hoist, is known from DE 41 05 050 C2. The lifting gear has a support hook as an upper fastening element and a load hook as a lower limit stop element. The upper fastening element and the lower limit stop element are indirectly connected to one another via a housing. The limit stop element is connected via a load chain as a traction means to a traction means drive, which is located in the housing of the lifting gear. The traction means drive is able to be set in rotation within the housing by a pivoting movement of a hand lever. For this purpose, the lever arm engages in a transmission device, which in turn is connected to the traction means drive. In this way an object is able to be moved or lashed.

In addition to a drive with a switchable ratchet mechanism, the traction means drive includes a load pressure brake, a load chain wheel and a transmission, wherein the transmission is often designed as a planetary transmission. The hand lever and the locking wheel of the ratchet mechanism sit at one end of a drive shaft which passes through the load pressure brake and the load chain wheel. At the other end of the drive shaft is the transmission, which is then connected to the load chain wheel to transmit torque.

The load pressure brake includes a locking wheel disc with recesses or teeth provided on its outer circumference, two friction elements located on both sides of the locking wheel disc, mostly friction discs or linings, as well as two locking latches hinged to the housing, which are pressed against the locking wheel disc under the influence of locking hook springs. The two friction elements enter into a frictional connection on the one hand with the locking wheel disc and on the other hand with a pressure disc or the locking wheel attached to the shaft. The locking wheel is axially displaceable on a movement thread of the drive shaft.

The load pressure brake has the task of holding the load carried by the lifting gear at the respective height or position when the locking wheel is stationary. Then the locking wheel is pressed against the pressure disc via the locking wheel disc and the integrated friction elements. The locking latches are located in the circumferential recesses of the locking wheel disc. If the locking wheel is turned in the lifting direction, the locking latches slide over the teeth of the locking wheel disc until the locking wheel comes to a standstill. Then the locking latches snap back into the recesses in the locking wheel disc. When the load is lowered, the locking wheel is rotated in the opposite direction, and slides axially on the movement thread of the drive shaft and the frictional contact with the friction elements of the locking wheel disc and the pressure disc is cancelled. The load is able to be lowered until the rotating shaft compensates for the axial play again.

In some situations, such as when tensioning ropes or when lifting and holding swinging loads, the acceleration and excessive rotational speed of the drive or drive shaft is able to be so high that the standard load pressure brake no longer engages because the locking latches due to their inertia, are no longer able to engage with the recesses of the locking wheel disc. In some situations, this arises when working at great heights on overhead lines. There is then the risk of the load chain fraying out. Such a situation also occurs when lowering against a jammed load chain. Even if the locking hooks of the load pressure brake cannot move freely due to extraordinary circumstances such as corrosion or ice formation, such a situation is able to arise.

EP 0 279 144 B1 relates to a safety brake for a driven shaft. This comprises a brake disk and a cam disk for a roller which is able to be pressed on by a release spring and which causes a locking latch to engage in a toothed ring arranged on the shaft when the rotational speed of the shaft is too high.

In addition to the load pressure brake, EP 3 395 746 A1 proposes a further safety device in the form of a safety brake which uses the centrifugal force of centrifugal elements to limit the speed.

SUMMARY

The disclosure is based on the object of providing lifting gear which is improved in terms of safety and operational technology, such as a lever hoist, in which an inadmissible increase in the rotational speed of the drive shaft is prevented.

This object is achieved according to the disclosure in lifting gear.

Lifting gear, such as a lever hoist, comprises a housing in which a load chain wheel and a drive shaft that drives the load chain wheel via a transmission are rotatably mounted. A drive, a load pressure brake and a safety brake are also provided. A load chain is able to be moved via the load chain wheel.

The safety brake has a locking disc with locking teeth and a control disc with control cams, as well as a catch hook. According to the disclosure, the locking disc and the control disc are able to be rotated relative to one another, the rotation being limited by a rotational travel limiter. The catch hook is arranged to be pivotable. The catch hook is arranged to move in a swiveling manner and has a latch contour at a front end and a sensing contour at a rear end. The catch hook is assigned to the locking disc and the control disc in such a way that the sensing contour, under the influence of a spring element, rests against the control disc, such as the outer contour of the control disc, and slides along this when the control disc is rotated. The latch contour is able to be brought into locking engagement with a locking tooth of the locking disc. This means that in normal operation of the lifting gear, the catch hook is guided with the sensing contour over the control disc and the latch contour does not engage the locking disc. In the event of release when a defined rotational speed is exceeded, the sensing contour of the catch hook lifts off the control disc or the control cam of the control disc and the latch contour of the catch hook snaps into a locking tooth on the locking disc. As a result, the locking disc is stopped while the control disc, which is arranged coaxially behind the locking disc, continues to rotate along a predetermined rotational path of the rotational travel limiter until the rotational path is exhausted and the locking disc and the control disc lock against each other.

This creates a positive connection between the drive shaft and the lifting gear. Emergency braking takes place. A spinning of the load chain wheel or a rushing out of the load chain is prevented. During the interlocking, the control disc actively presses the catch hook into the recess or the locking tooth of the locking disc. In the locked position, the control disc also prevents the locking hook from turning back so that the safety brake is locked.

After the safety brake is released, the locking disc is in the blocked end position. To release the lock, the locking disc and the control disc must be aligned with one another again. For this purpose, an unlocking mechanism is provided to return the locking disc and control disc to their starting position. The unlocking mechanism includes a reset button and a blocking body which is designed to block the locking disc while the control disc connected to the drive shaft is rotated in the stroke direction (clockwise) until the two discs are aligned with each other again in the starting position.

The blocking body is able to be brought into an unlocked position by actuating the reset button. In the unlocked position, the locking disc comes to rest on the blocking body and is held by this in such a way that the control disc is able to be rotated relative to the locking disc and is able to be rotated into the starting position. The unlocking mechanism creates the possibility of unlocking the safety brake from the outside without having to dismantle the device. In this way, the safety brake is able to be completely reset to its normal operating state, i.e. the standby mode, in the starting position of the locking disc and control disc. The unlocking is initiated by actuating the reset button. The blocking body is thereby brought into the unlocked position. The safety brake is turned clockwise using the handwheel until the locking disc comes to rest on the blocking body. This is done with an outer flank of the locking disk, which rests against an abutment surface of the blocking body. In this position, further clockwise rotational movement of the locking disc is not possible. The locking disc is held by the blocking body. The safety brake is then turned further clockwise via the handwheel, usually by an angle of 45°, until the locking disc and the control disc are congruent again. In this position the safety brake engages noticeably. The unlocking mechanism is able to be automatically released, i.e., the reset button and the blocking body are able to automatically return to their original position or be released manually.

The reset button is rotatably mounted in the housing, and is pivotable to a limited extent.

Another useful configuration provides that the reset button interacts with a tension spring. The tension spring is used to release the unlocking mechanism and to move the reset button and the blocking body back to their starting position after unlocking.

In some embodiments, the reset button and the blocking body form a unit.

The unlocking mechanism is able to have a latch which secures the reset button and/or the blocking body in the unlocked position.

The blocking body is able to be brought into an unlocked position by actuating the reset button, in which the locking disc is held by the blocking body in such a way that the control disc is able to be rotated relative to the locking disc and so the control disc and the locking disc are again aligned congruently with one another, i.e. is able to be transferred into the starting position. The blocking body has an abutment surface on which the locking disc is supported in the unlocked position with an outer flank of a locking tooth.

One aspect of the disclosure provides that the latch has a latch body which engages in a latch receptacle in the unlocked position. The unlocking process is then carried out and the locking disc and the control disc are returned to their initial aligned position. In the starting position, the locking disc and the control disc work together, with the joint rotational movement applying such a high torque or force to the abutment surface of the blocking body that the latch body is moved, e.g., lifted, out of the latch receptacle. The unlocked position is then cancelled and the tension spring swivels the reset button and the blocking body into the starting or neutral position.

In some embodiments, the lifting gear according to the disclosure provides that the blocking body has a tooth contour with a tooth flank which is able to be brought into engagement with a locking tooth of the locking disc. This configuration creates the possibility of bringing the safety brake into a parking mode in which the safety brake is locked manually.

To manually lock the safety brake, the reset button is also actuated until in the unlocked position. The safety brake is able to be turned anticlockwise using the handwheel until the locking tooth of the locking disc rests on the tooth flank of the tooth contour of the blocking body. The safety brake is then turned 45° further anticlockwise using the handwheel until the locking disc and the control disc are completely interlocked. In this position the safety brake engages noticeably. The reset button springs back automatically or is released manually. The tension spring swivels the reset button and the blocking body back into the starting position. The safety brake is now locked. After a further rotation of a maximum of 45° anticlockwise, the catch hook of the safety brake would automatically take over the load. Further movement, such as lowering a load, is then no longer possible.

Another aspect of the disclosure provides that the rotational travel limiter has at least one cam track and a limit stop body which are able to be displaced along the cam track. In the end position, i.e., after exhaustion of the rotational path between the locking disc and the control disc, the limit stop body comes to a stop at the end of the cam track in a blocking manner.

The cam track is formed by an elongated hole. The elongated hole is formed in the control disc. An elongated hole is arcuate with a radius around the centre of the control disc. A plurality of elongated holes are able to be provided offset from one another on a partial circle in the control disc. In some embodiments, the cam track is formed in a groove. This is able to be provided in the control disc or in the locking disc.

The limit stop body is a pin. The limit stop pin or pins are fixed in the locking disc and protrude in the direction of the control disc, engaging in the elongated holes.

Another configuration provides that latching elements are incorporated between the locking disc and the control disc. These fix the locking disc and the control disc in the starting position or in the end position. The latching elements are formed by balls. The latching elements are held in receptacles and interact with latching surfaces. In some embodiments, the receptacles are in the control disc and the latching surfaces are formed in the locking disc.

A plurality of locking teeth are arranged in a uniformly distributed manner on the circumference of the locking disc. Likewise, a plurality of control cams are provided evenly distributed on the circumference of the control disc. The control cams are formed by the contour of the control disc itself. For this purpose, the control disc is configured in a triangular shape with a rounded outer contour.

The control disc has a central connector provided with inner toothing. With the inner toothing, the control disc sits on a length section of the drive shaft provided with outer toothing. The control disc with a central bearing section is positioned on the central connector. The locking disc is secured on the connector by means of securing elements.

In some embodiments, in the starting position of the locking disc and control disc, the rear outer contour of the locking teeth is aligned with the outer contour of the control disc. The control disc covers the adjacent flat side of the locking disc.

The catch hook of the safety brake is pivotably mounted on a bolt on a side plate that is able to be integrated into the housing. The spring element is a leg spring.

Optionally, damping elements is able to be incorporated between the locking disc and the control disc in order to dampen the braking effect during emergency braking.

The lifting gear according to the disclosure is able to be used in a wide variety of applications, for example, in an application with reversing loads, or in overhead line construction, or for personal safety.

The lifting gear is compact and lightweight. The additional securing function via the safety brake is implemented with just a few parts. The mechanics require an active movement, so that if the spring is no longer available, the locking latches of the load pressure brake, etc., become stuck, and the safety brake is released. The safety brake locks automatically. As a result, the catch hook always remains in engagement even if the load oscillates.

BRIEF DESCRIPTION OF THE DRAWINGS

The disclosure is explained in more detail below with reference to drawings.

DETAILED DESCRIPTION

Figure 1:
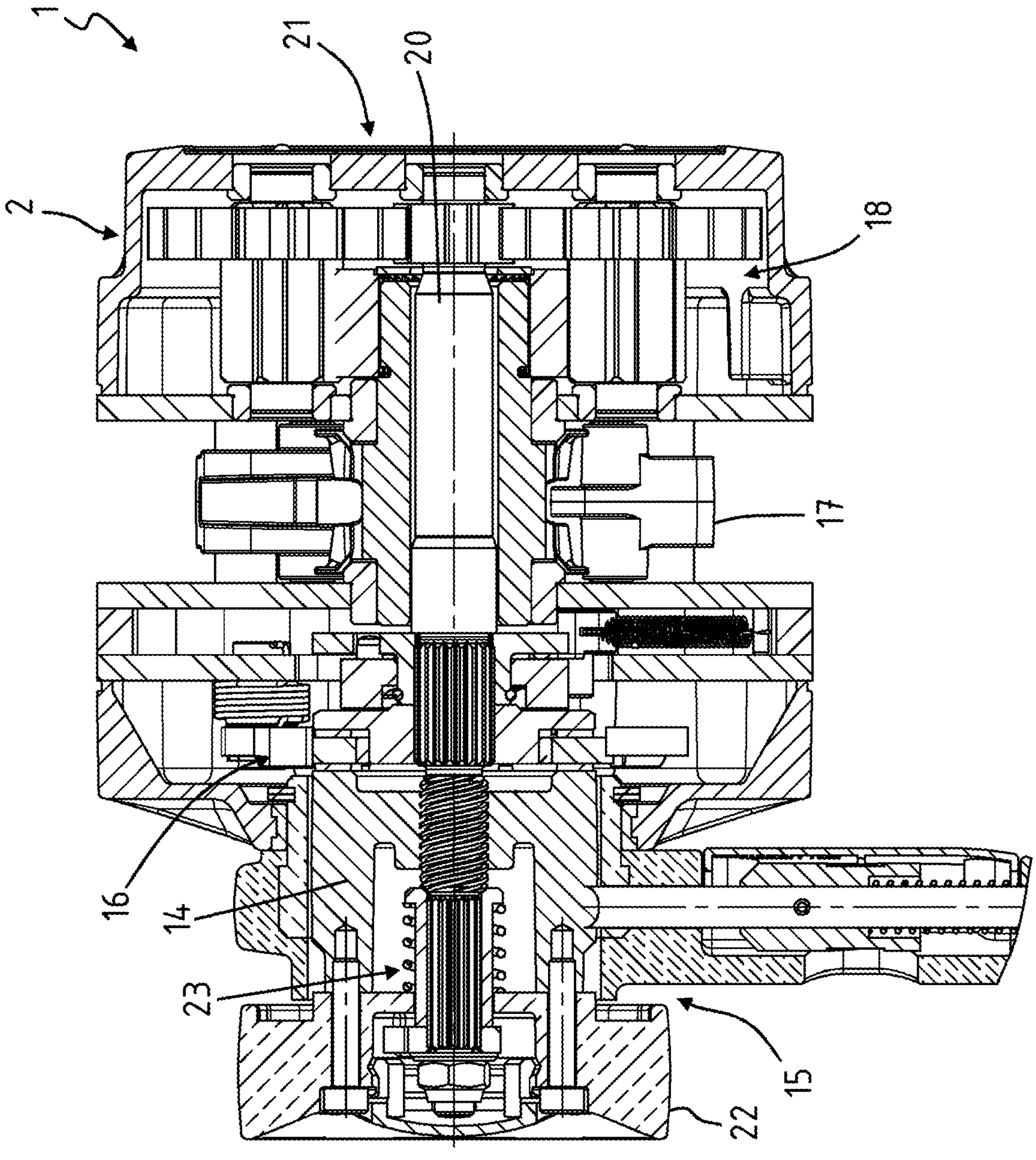
FIG. 1 shows lifting gear according to the disclosure in the form of a lever hoist in a longitudinal section.
Figure 2:
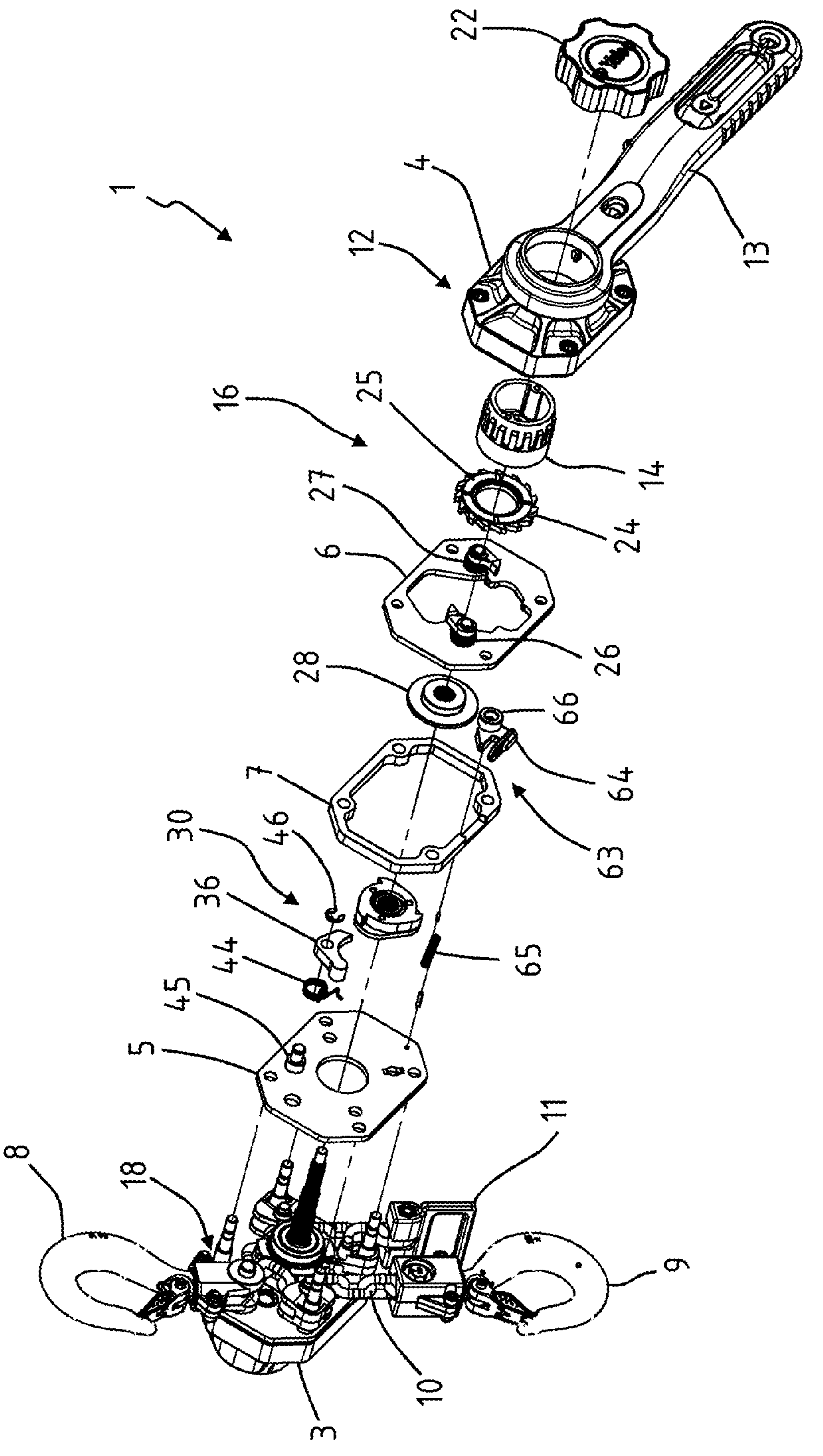
FIG. 2 shows the lever hoist in an exploded view of its components in accordance with the disclosure.

FIG. 1 and FIG. 2 show a lever hoist according to the disclosure in the form of a hand-operated lever hoist 1. A component of the lever hoist 1 is a housing 2, which is composed of several housing parts 3, 4 as well as side plates 5, 6 and distance frame 7. The lever hoist 1 has a support hook 8 as an upper fastening element and a load hook 9 as a lower limit stop element. The support hook 8 and the load hook 9 are indirectly connected to one another via the housing 2. The load hook 9 is attached to one end of a load chain 10. At the other end of the load chain 10, a chain end piece 11 is provided. The load chain 10 is able to be moved via a traction means drive. The traction means drive substantially comprises a drive 12 with a hand lever 13, a locking wheel 14 and a switchable ratchet mechanism 15, a load pressure brake 16, a load chain wheel 17 and a transmission 18. The hand lever 13 and the locking wheel 14 of the ratchet mechanism 15 sit at one end 19 of a drive shaft 20 which passes through the load pressure brake 16 and the load chain wheel 17. At the other end 21 of the drive shaft 20 is the transmission 18, which is connected to the load chain wheel 17 in a torque-transmitting manner. A handwheel 22 is used to move the locking wheel 14 axially on the drive shaft 20 in order to actuate a freewheel mechanism 23 of the lever hoist 1.

Figure 3:
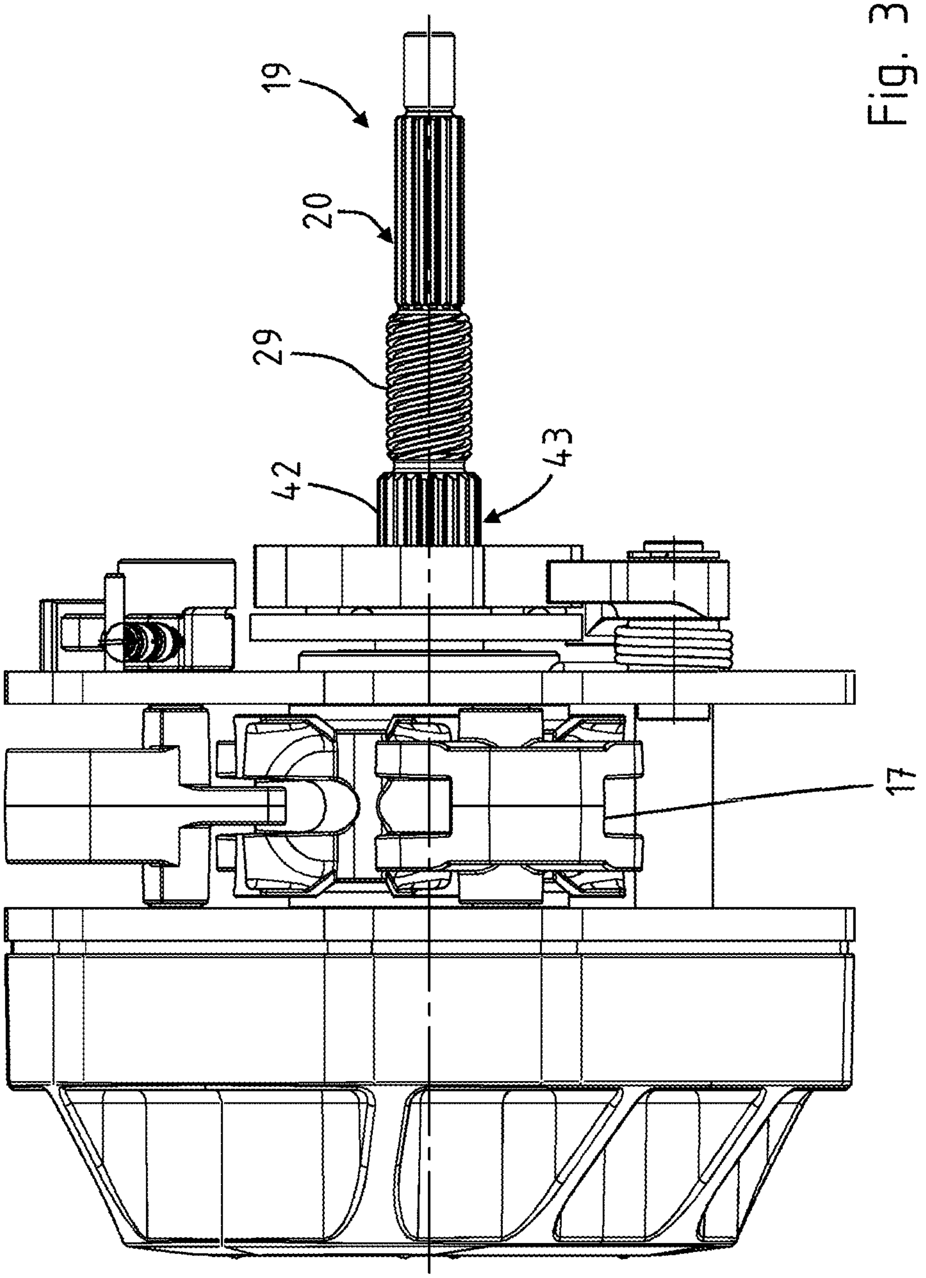
FIG. 3 shows a side view of part of the lever hoist in accordance with the disclosure.
Figure 4:
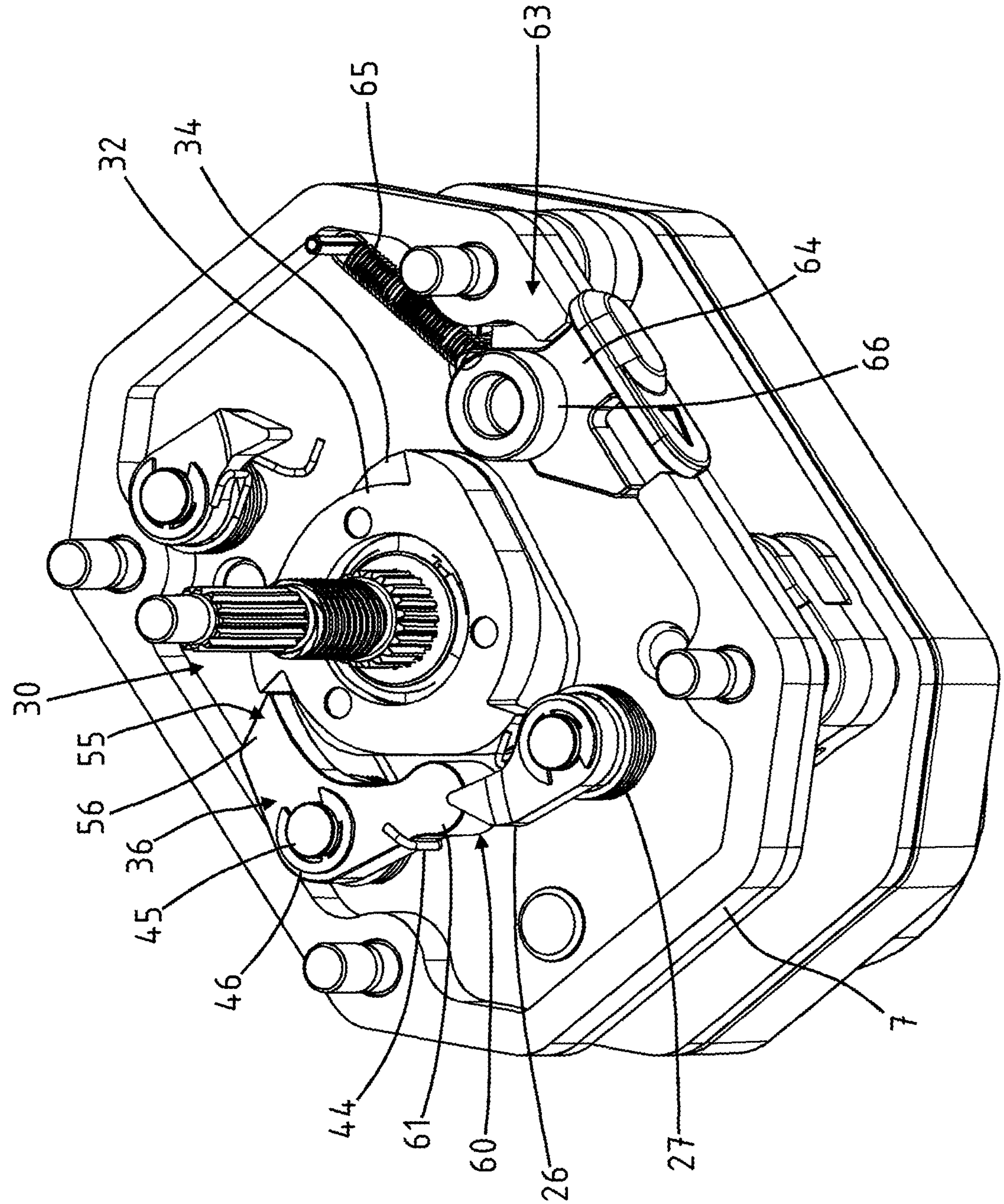
FIG. 4 shows a perspective view of the safety brake of the lever hoist in accordance with the disclosure.
Figure 7:
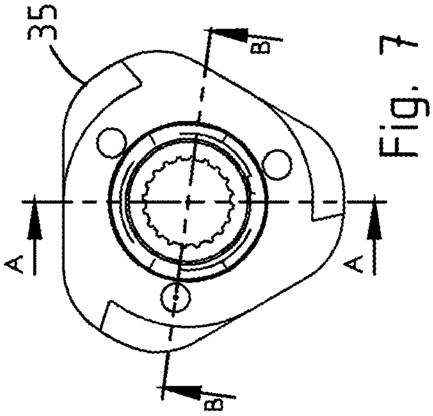
FIG. 7 shows a view of the illustration of FIG. 5 from above in accordance with the disclosure.
Figure 10:
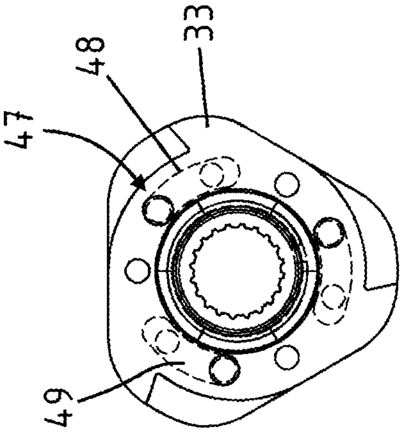
FIG. 10 shows the illustration corresponding to FIG. 5 in a view from below in accordance with the disclosure.
Figure 5:
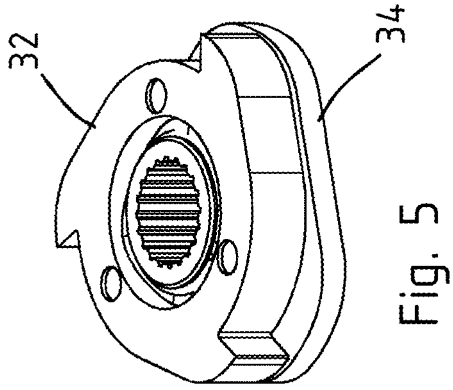
FIG. 5 shows a perspective view of the locking disc and the control disc of the safety brake in accordance with the disclosure.
Figure 9:
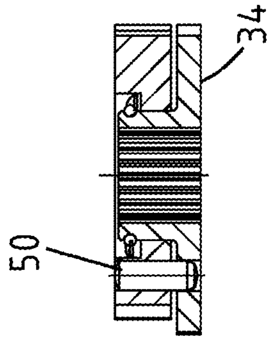
FIG. 9 shows a section through the illustration of FIG. 7 along the line B-B in accordance with the disclosure.
Figure 8:
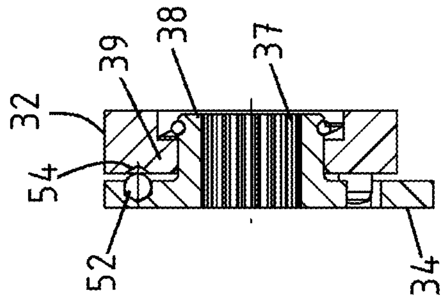
FIG. 8 shows a section through the illustration of FIG. 7 along the line A-A in accordance with the disclosure.
Figure 6:
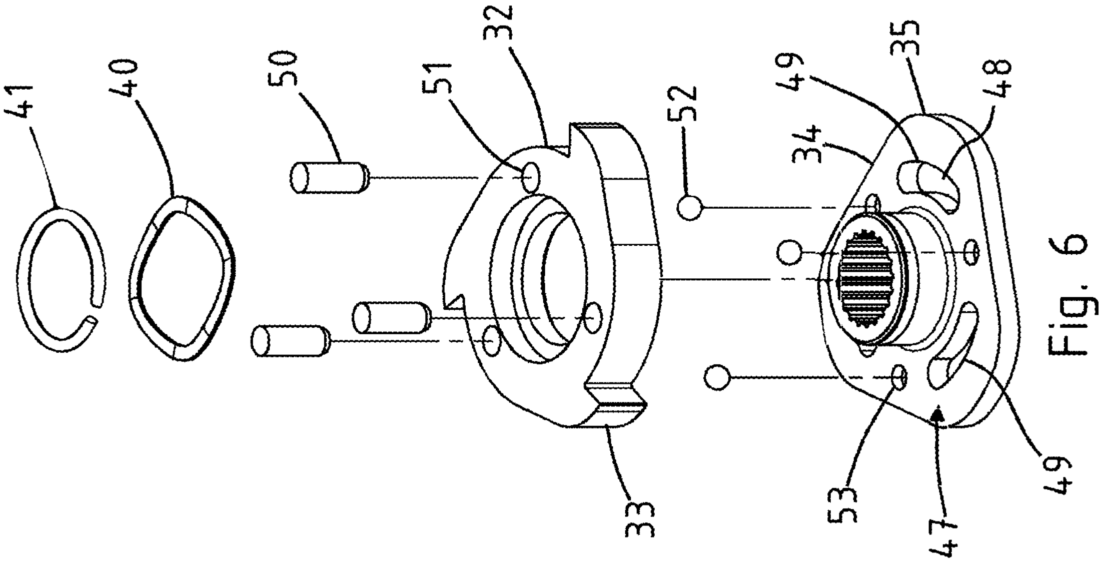
FIG. 6 shows components of the safety brake in an explosion-like exploded manner of illustration in accordance with the disclosure.

The load pressure brake 16 has a locking wheel disk 24 provided with teeth on its outer circumference. The locking wheel disc 24 is provided on both sides with friction elements 25 in the form of friction linings. Furthermore, the load pressure brake 16 has two locking latches 26 which are pivotably mounted on the side plate 6 in the housing 2 and which are pressed against the locking wheel disc 24 under the influence of locking hook springs 27. Moreover, the load pressure brake 16 includes a pressure disc 28 on which the locking wheel disc 24 is mounted. The locking wheel 14 is axially displaceable on a movement thread 29 of the drive shaft 20. FIG. 3 shows the lever hoist 1 with the locking wheel 14, hand lever 13 and handwheel 22 removed.

The load pressure brake 16 has the task of holding the load carried by the lever hoist 1 when the locking wheel 14 is stationary. Then the locking wheel 14 is pressed against the pressure disc 28 via the locking wheel disc 24 and the integrated friction elements 25. The locking latches 26 are located in the circumferential recesses of the locking wheel disc 24. If the locking wheel 14 is turned in the lifting direction, the locking latches 26 slide over the teeth of the locking wheel disc 24 until the locking wheel 14 comes to a standstill. Then the locking latches 26 snap back into the recesses of the locking wheel disc 24. When the load is lowered, the locking wheel 14 is rotated in the opposite direction, and slides axially on the movement thread 29 of the drive shaft 20 and the frictional contact with the friction elements 25 of the locking wheel disc 24 and the pressure disc 28 is cancelled. The load is able to be lowered until the rotating drive shaft 20 compensates for the axial play again.

In addition to the standard load pressure brake 16, the lever hoist 1 has a safety brake 30, 31. The safety brake 30, 31 has the task of performing emergency braking in extreme situations in which the rotational speed of the drive shaft 20 is able to be so high that the load pressure brake 16 no longer engages due to inertia.

A safety brake 30 and its mode of operation is described with reference to FIG. 4 to FIG. 17. A corresponding embodiment of a safety brake 31 is also shown in FIG. 18 to FIG. 23. Mutually corresponding components or structural components are provided with the same reference symbols. The safety brake 30, 31 is arranged coaxially below or behind the load pressure brake 16 in the direction of the load chain wheel 17.

The safety brake 30, 31 has a locking disc 32 with locking teeth 33 and a control disc 34 with control cams 35, as well as a catch hook 36. A plurality of locking teeth 33, three in the exemplary embodiment, are arranged in a uniformly distributed manner on the circumference of the locking disc 32. The control disc 34 has a triangular configuration with control cams 35 which are rounded on its circumference. The control disc 34 has a central connector 38 provided with an inner toothing 37, on which the locking disc 32 is positioned with a central bearing section 39 and is secured in position by securing elements 40, 41. The control disc 34 and, with the control disc 34, the locking disc 32 are held on a threaded section 43 of the drive shaft 20 provided with an outer toothing 42 via the central connector 38 and the inner toothing 37.

The catch hook 36 is arranged to be pivotable on the side plate 5 of the lever hoist 1. With the incorporation of a spring element 44 in the form of a leg spring, the catch hook 36 is mounted on a bolt 45 on the side plate 5 and secured by a securing ring 46. The mounting of the catch hook 36 on the bolt 45 is in the middle length region of the catch hook 36, so that the catch hook 36 is mounted like a rocker.

The locking disc 32 and the control disc 34 are able to be rotated in relation to one another. The rotation of locking disc 32 and control disc 34 relative to one another is limited by a rotational travel limiter 47. The rotational travel limiter 47 comprises a cam track 48 which is formed in an elongated hole 49 in the form of a section of a circular arc in the control disc 34. A limit stop body 50 in the form of a pin is able to be displaced along the cam track 48. Three elongated holes 49 are arranged uniformly offset on a partial circle in the control disc 34. Correspondingly, three pins are incorporated as limit stop bodies 50 in mounting openings 51 of the locking disc 32. The limit stop bodies 50 protrude in the direction of the control disc 34 with respect to the locking disc 32 and engage in the elongated holes 49. In the exemplary embodiment shown here, the rotational travel limiter 47 enables the locking disc 32 to be rotated by 45° with respect to the control disc 34.

Latch elements 52 in the form of steel balls are incorporated between the locking disc 32 and the control disc 34. The latch elements 52 fix the locking disc 32 and the control disc 34 in the starting position or in the end position after rotation. The latch elements 52 are held in receptacles 53 in the control disc 34 and contact spherical section-shaped latch surfaces 54 in the locking disc 32 and cooperate with them in an opposing and movement-inhibiting manner.

The catch hook 36 has a latch contour 56 at a front end 55. The latch contour 56 has a pointed catch tooth 57 with a frontal catch flank 58, which is configured to be adapted to a front locking flank 59 of a locking tooth 33 of the locking disc 32.

At the rear end 60, a sensing contour 61 is formed on the catch hook 36. For this purpose, the rear end 60 of the catch hook 36 is designed to be rounded. With the sensing contour 61, the catch hook 36 rests against the outer contour of the control disc 34 under the influence of the leg spring. The spring element 44 has the effect that the latch contour 56 lies outside the outer circumference of the locking disc 32 during normal operation. In normal operation, the catch hook 36 slides with the rear sensing contour 61 along the control disc 34. The front latch contour 56 is lifted out.

When a certain excessive rotational speed is exceeded, the sensing contour 61 of the catch hook 36 lifts off the control disc 34 or the control cam 35 due to the inertia and the acting acceleration forces. The catch hook 36 tilts and rotates around the bolt 35 in the locking disc 32. The latch contour 56 of the catch hook 36 snaps into a locking tooth 33 of the locking disc 32 and there comes to rest with the catch flank 58 on the locking flank 59. As a result, the locking disc 32 is stopped while the control disc 34 arranged coaxially behind the locking disc 32 continues to rotate along the predetermined rotational path of the rotational travel limiter 47. The rotation takes place until the limit stop bodies 50 come to the limit stop of the elongated holes 49 located in the direction of rotation. The locking disc 32 and the control disc 34 are able to be blocked in relation to one another. In this way, a positive connection between the drive shaft 20 and the lever hoist 1 is established. Any further spinning of the load chain wheel 17 or a rushing out of the load chain 10 is prevented.

Figure 11:
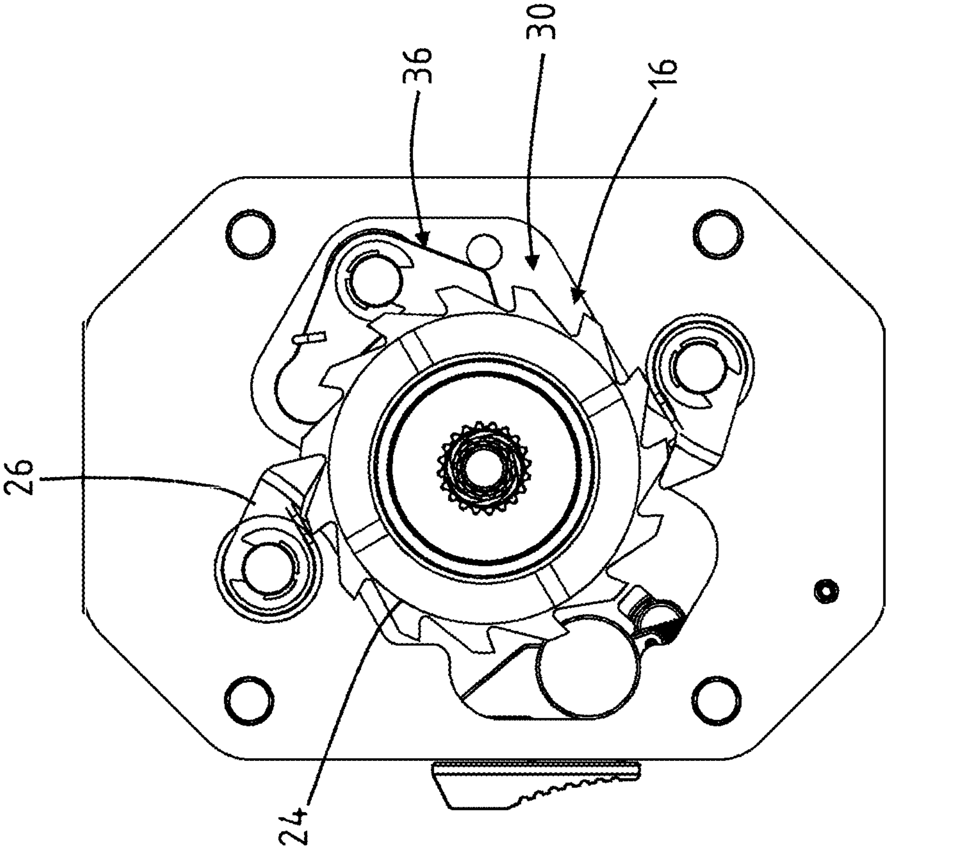
FIG. 11 shows the opened lever hoist with a view of the region of the load pressure brake and the safety brake in a normal situation in accordance with the disclosure.

FIG. 11 shows a normal situation of load pressure brake 16 and safety brake 30. The locking latches 26 engage the locking wheel disc 24 and hold the load.

Figure 12:
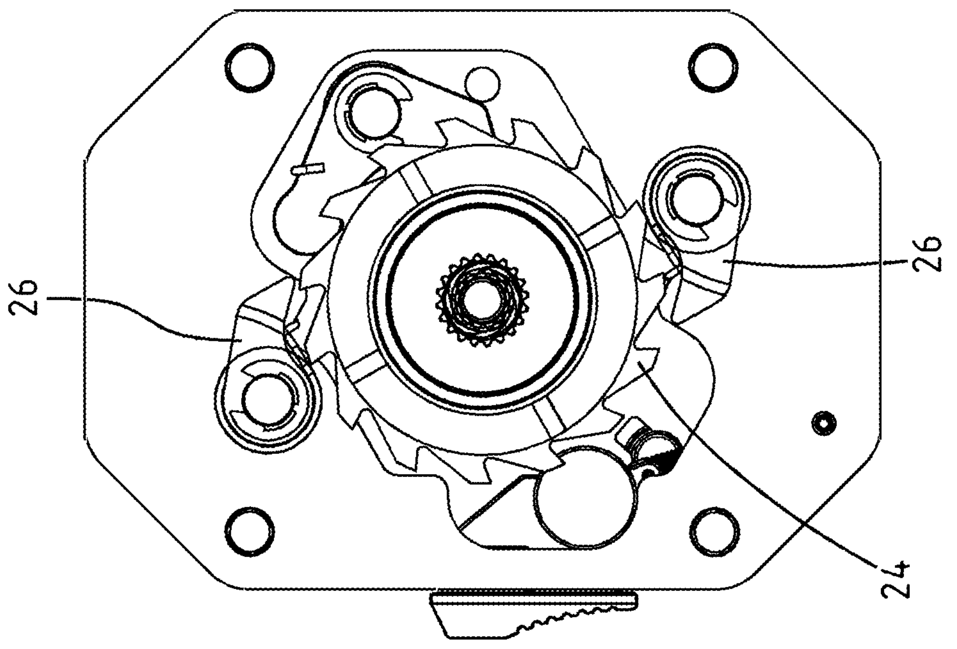
FIG. 12 shows the illustration corresponding to FIG. 11 in a problematic situation in accordance with the disclosure.

FIG. 12 shows a problematic situation. The locking latches 26 of the load pressure brake 16 are not free to move. The locking latches 26 do not engage the locking wheel disc 24. A load cannot be held. This is able to lead to a dangerous excessive rotational speed increase in the opposite direction to the pulling direction of the lever hoist 1, combined with a rushing out of the load chain 10.

Figure 14:
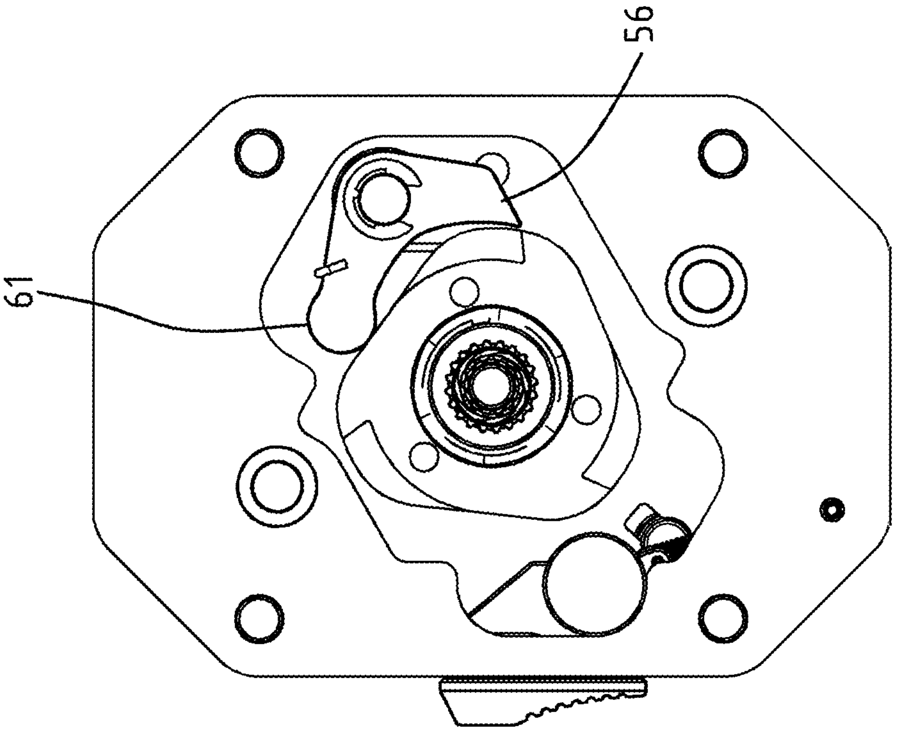
FIG. 14 shows the safety brake in a second operating situation in accordance with the disclosure.
Figure 13:
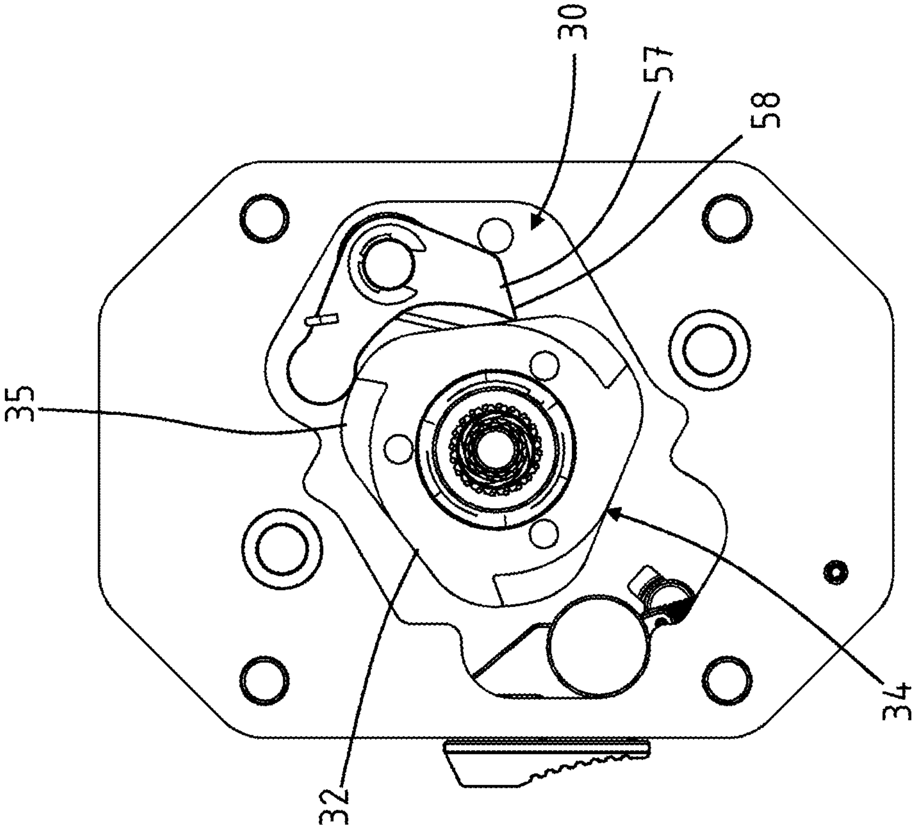
FIG. 13 shows a view of the safety brake of the lever hoist in a first operating situation in accordance with the disclosure.
Figure 16:
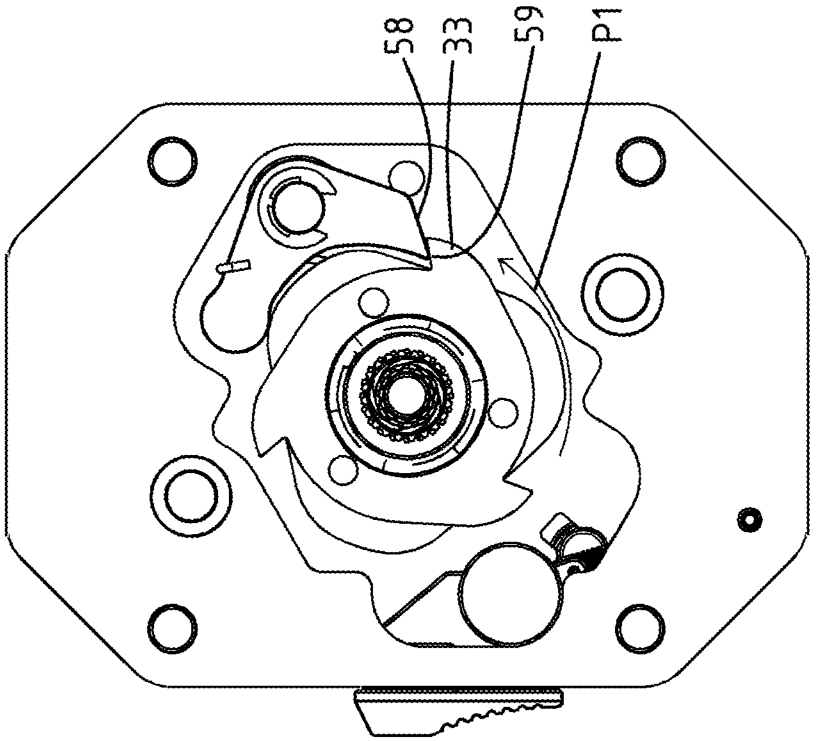
FIG. 16 shows the safety brake in a fourth operating situation in accordance with the disclosure.
Figure 15:
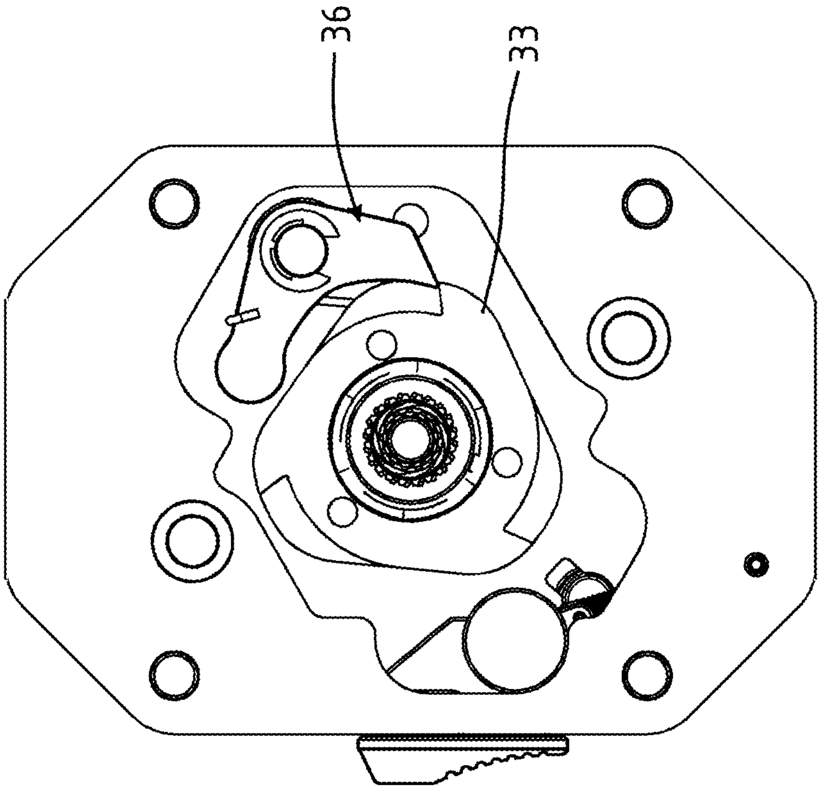
FIG. 15 shows the safety brake in a third operating situation in accordance with the disclosure.
Figure 17:
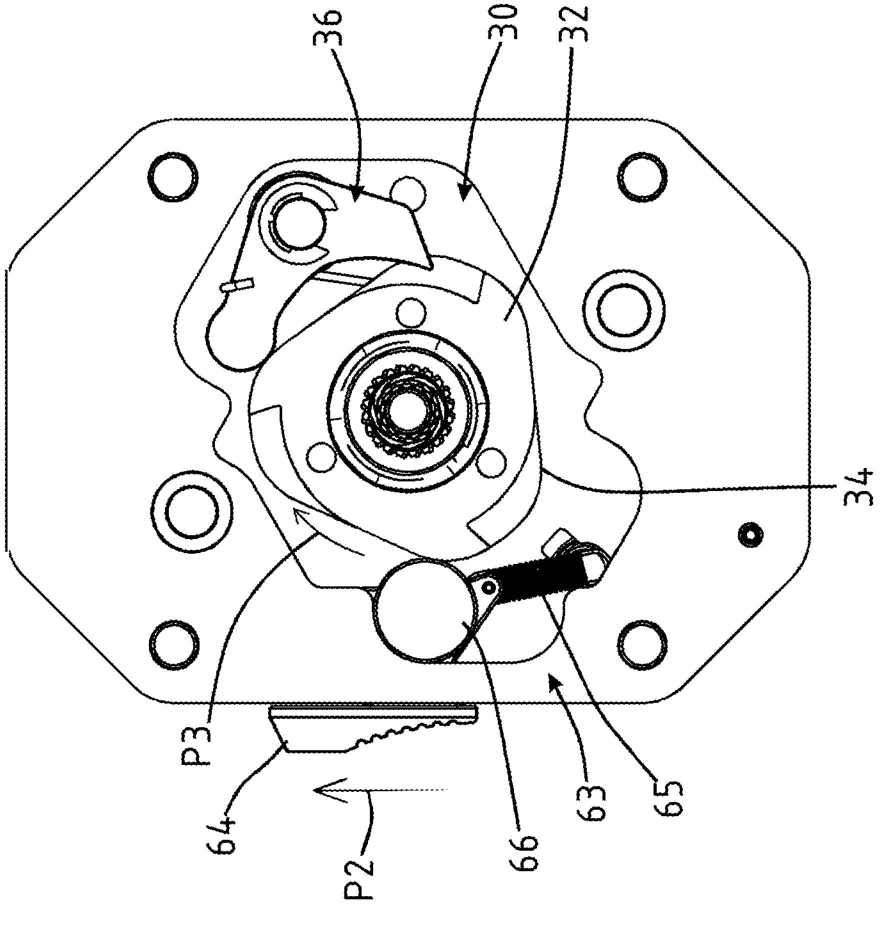
FIG. 17 shows the illustration of the safety brake with an unlocking mechanism during an unlocking process for resetting the locking disc and control disc to their starting position in accordance with the disclosure.

FIG. 13 and FIG. 14 show the safety brake 30 each in a normal situation or starting position. The locking disc 32 and the control disc 34 are aligned in such a way that the rear outer contour of the locking teeth 33 coincides with the outer contour of the control disc 32. The sensing contour 61 of the catch hook 36 is pressed against the outer contour of the control disc 34 by the spring force of the leg spring and slides along the control cam 35. The sensing contour 61 lies on a control cam 35 both in the top dead centre of the control disc 34 (FIG. 13) and in the bottom dead centre of the control disc 34 (FIG. 14). During the rotation of the control disc 34 and locking disc 32, the front latch contour 56 of the catch hook 36 is lifted out of the effective region of the locking disc 32 or its locking teeth 33.

With increasing acceleration of the drive shaft 20 and the safety brake 30, i.e. at excessive speed, caused for example by a falling load, the sensing contour 61 of the safety hook 36 is accelerated outward and lifts off the control disc 34. The front catch tooth 57 of the latch contour 56 snaps into the locking disc 32 (see FIG. 15) and comes to rest with its frontal catch flank 58 blocking the locking flank 59 of a locking tooth 33 (see FIG. 16). After the catch hook 36 has collapsed, the control disc 34 rotates further anticlockwise (arrow P1) by 45°, driven by the load, and thereby locks the locking wheel 14. This effect is self-reinforcing, i.e. the catch hook 36 falls the deeper the more the sensing contour 61 on the opposite side is raised by the control disc 34.

In order to release the blocking of the safety brake 30 and to put the control disc 34 and the locking disc 32 back into the aligned initial state, an unlocking mechanism 63 is provided. In the configuration according to FIG. 17, this includes a reset button 64 in the form of a slide for actuating the unlocking mechanism 63 and a blocking body 66 under the influence of a tension spring 65. By actuating the reset button 64 (arrow P2) the locking disc 32 is blocked with the blocking body 66 and is held in place so that the locking disc 32 is prevented from rotating, while the control disc 34 is actuated in the lifting direction (clockwise) (arrow P3) via the handwheel 22 or the hand lever 13. In this way, the locking disc 32 and the control disc 34 are displaced relative to one another and brought into their aligned starting position.

The lever hoist 1 shown in FIG. 18 to FIG. 23 has a safety brake 31 which corresponds in structure and mode of operation to the safety brake 30 explained above. The safety brake 31 has, as described above, a locking disc 32 with locking teeth 33 and a control disc 34 with control cams 35, as well as a catch hook 36.

The lever hoist 1 has an unlocking mechanism 63. The unlocking mechanism 63 has a reset button 64 and a blocking body 66 which functionally form a unit 67. The reset button 64 and the blocking body 66 are non-positively and positively connected to one another.

The reset button 64 is rotatable or pivotable in the housing 2 of the lever hoist 1, mounted about a bolt 68. The reset button 64 interacts with a tension spring 65 which is mounted in the housing 2 and engages the lever arm 69 of the reset button 64.

The unlocking mechanism 63 also has a latch 70 with a latch body 71 which is able to be displaced against the force of a compression spring, not shown here, arranged in the reset button 64.

A support strip 72 is provided in the housing 2. Two latch receptacles 73, 74 are formed in the support strip 72 at a distance from one another. The latch body 71 engages in the latch receptacles 73, 74 depending on the position of the reset button 64.

In principle, the unlocking mechanism 63 is able to be designed without a latch 70 and the latch function. To carry out an unlocking process, the reset button 64 is then actuated and held manually.

Figure 18:
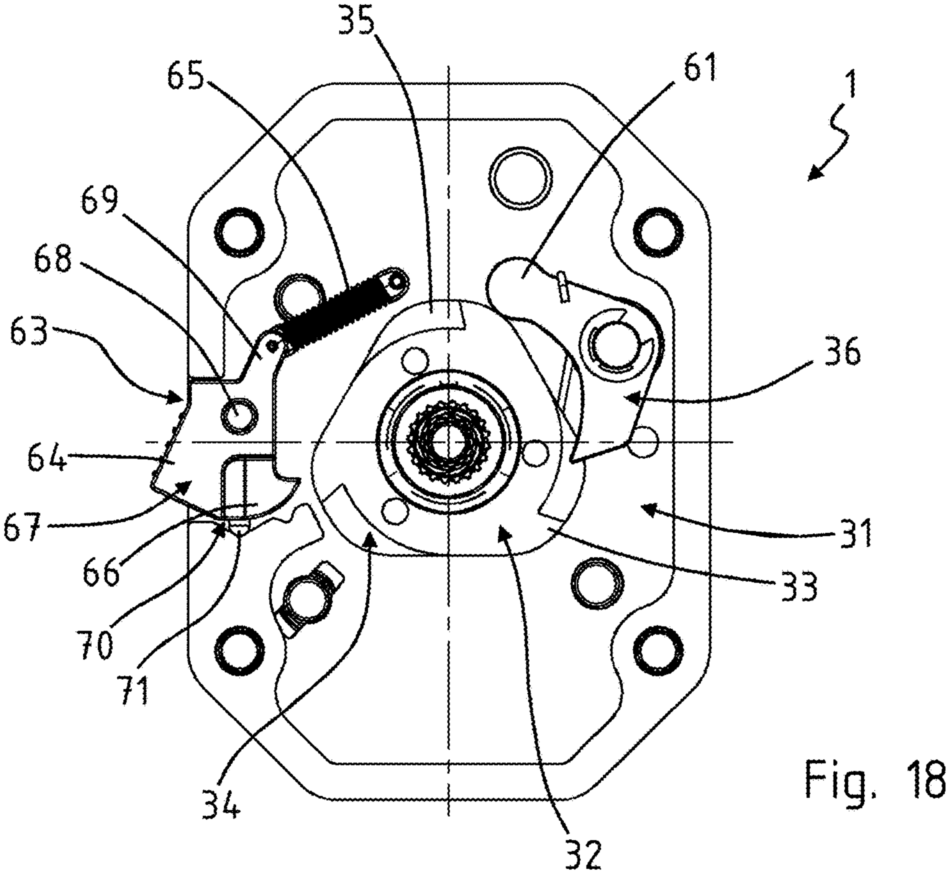
FIG. 18 shows a lever hoist with an unlocking mechanism in the standby mode in accordance with the disclosure.

FIG. 18 shows the lever hoist 1 and the safety brake 31 in standby mode, i.e. the locking disc 32 and the control disc 34 of the safety brake 31 are in their starting position, in which the locking disc 32 and the control disc 34 are congruent, i.e. the rear outer contour of the locking teeth 33 is aligned with the outer contour of the control disc 34. The sensing contour 61 of the catch hook 36 is spring-loaded against the control disc 34. A load is able to be raised and lowered at any time without any problems. The unlocking mechanism 63 is in its neutral position. The latch body 71 of the latch 70 is located in the first latch receptacle 73 located further out. The blocking body 66 is outside of its unlocked position E, and comes into operative connection with the locking disc 32.

Figure 19:
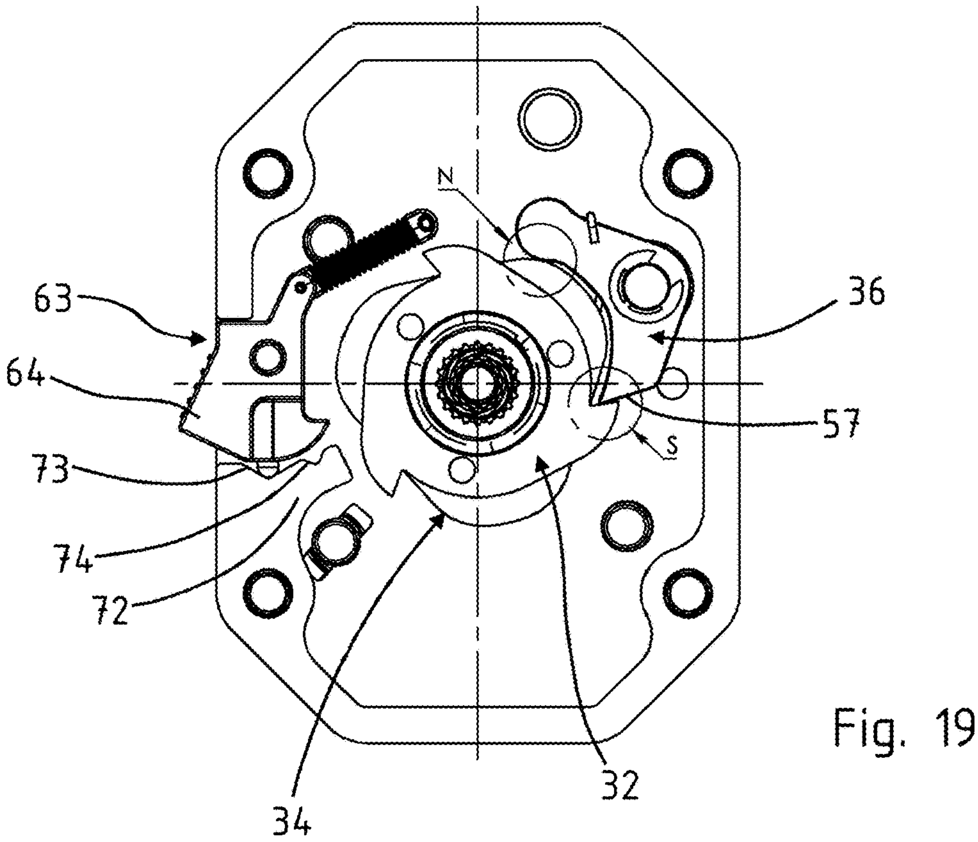
FIG. 19 shows the lever hoist corresponding to the illustration of FIG. 18 with the safety brake locked in accordance with the disclosure.

The illustration in FIG. 19 shows the safety brake 31 in the locked state. The safety brake 31 was released after a load was lowered too quickly or after the load chain was manually pulled too quickly in the load direction in the unlocking mode. The catch tooth 57 of the catch hook 36 engages in the locking disc 32 (point S). The locking disc 32 and the control disc 34 are interlocked with one another. The 45° rotated contour of the control disc 34 prevents the catch hook 36 from falling out (point N). As a result, the safety brake 31 or the lever hoist 1 is completely locked and no more lifting or lowering movements are possible.

Figure 20:
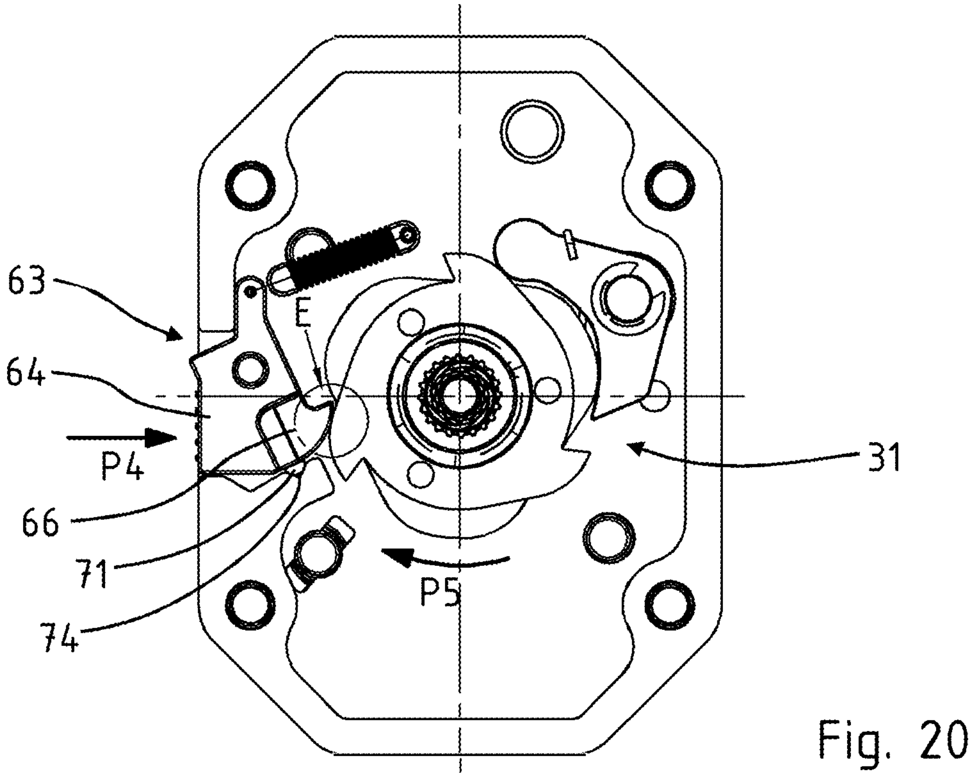
FIG. 20 shows the lever hoist in a first stage of the unlocking process in accordance with the disclosure.

In order to unlock the safety brake 31 from the outside and to reset the locking disc 32 and control disc 34 to their starting position, the unlocking mechanism 63 is actuated. In FIG. 20, the reset button 64 is pressed for this purpose (arrow P4). The reset button 64 is moved inwardly into the housing 2. The blocking body 66 is brought into an unlocked position E by the reset button 64. The latch body 71 of the latch 70 is moved with the reset button 64 and latches in the unlocked position E in the second inner latch receptacle 74. As a result, the reset button 64 and the blocking body 66 are secured in the unlocked position E.

The safety brake 31 is then turned clockwise (arrow P5) using the handwheel until the locking disc 32 comes to rest on the blocking body 66 (point E). In the unlocked position E, the blocking body 66 and the locking disc 32 come into an operative relationship.

The blocking body 66 has a profiled abutment surface 75 on its outside. In the unlocked position E, the locking disc 32 is supported with an outer flank 76 of a locking tooth 33 on the abutment surface 75. In the unlocked position E, the locking disc 32 is prevented from further rotation in the clockwise direction by the blocking body 66.

Figure 21:
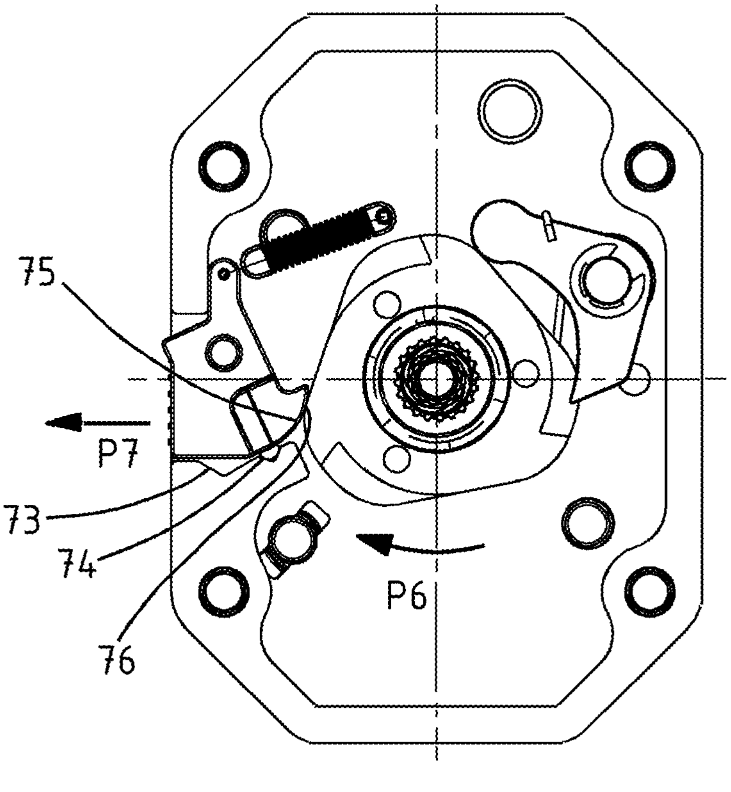
FIG. 21 shows the lever hoist in a second stage of the unlocking process in accordance with the disclosure.

In the unlocked position E, the locking disc 32 is held by the blocking body 66 in such a way that the control disc 34 is able to be rotated relative to the locking disc 32 and brought into the starting position (see FIG. 21). For this purpose, the safety brake 31 is rotated 45° further clockwise using the handwheel (arrow P6) until the locking disc 32 and the control disc 34 are congruent again, i.e. the starting position is reached. In this position the safety brake 31 engages noticeably. The reset button 64 springs back (arrow P7). This is brought about by the action of the control disc 34 and the locking disc 32 against the rounded contour of the abutment surface 75. When the control disc 34 is rotated into the congruent starting position with the locking disc 32, the limit stop bodies 50 are also moved in the elongated holes 49 of the rotational travel limiter 47 (see also FIG. 6 to FIG. 10 in this regard). In the starting position of locking disc 32 and control disc 34, limit stop bodies 50 designed as pins come to rest on the end of the cam track 48 or elongated holes 49. The torque applied via the handwheel is then transmitted via the control disc 34 and the locking disc 32 and the latch body 71 of the latch 70 is lifted out of the latch receptacle 74. The tension spring 65 pivots the reset button 64 back into its starting or neutral position in the standby mode. The safety brake 31 is ready for use again and is in its freely moving normal position.

Figure 22:
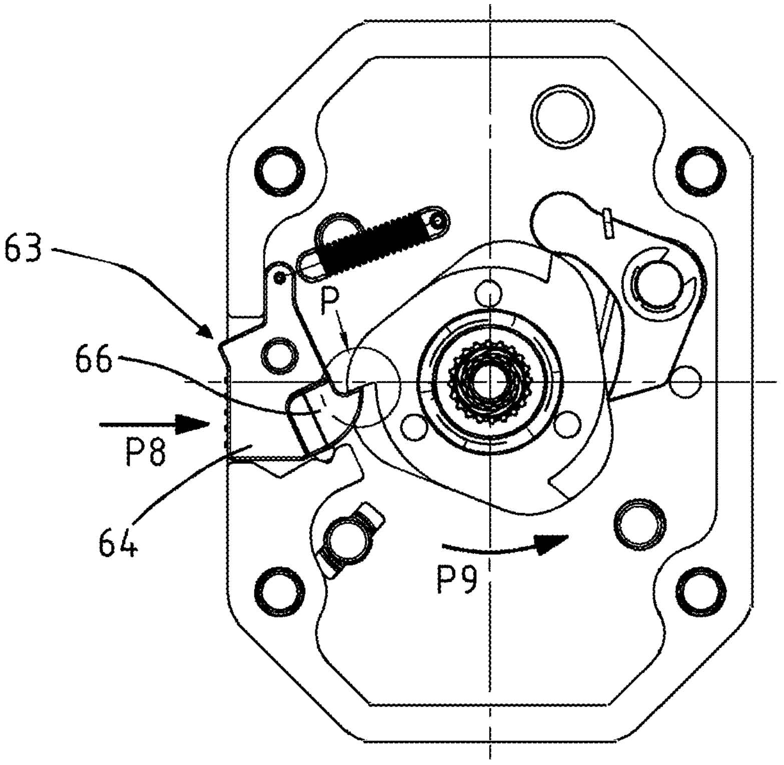
FIG. 22 shows the lever hoist with the illustration of the first stage of a manual locking process in accordance with the disclosure.
Figure 23:
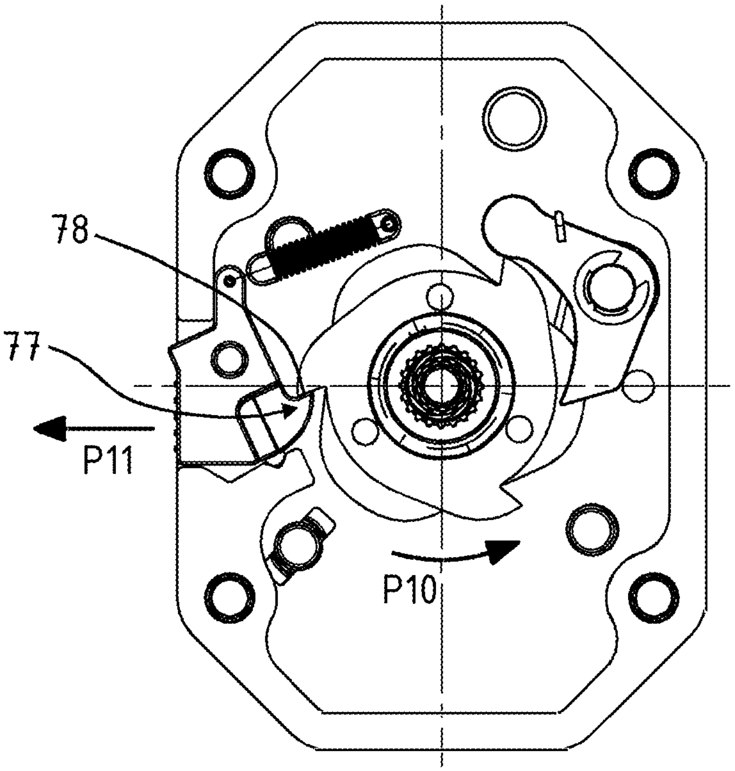
FIG. 23 shows the lever hoist in a second stage of a manual locking process in accordance with the disclosure.

A manual locking process of the safety brake 31 is explained with the aid of FIG. 22 and FIG. 23.

The blocking body 66 has a tooth contour 77 with a tooth flank 78.

In order to be able to lock the safety brake 31 manually, the reset button 64 is pressed (arrow P8) until engagement. The latch body 71 of the latch 70 is located in the first latch receptacle 74 located further out. The position corresponds to the unlocked position. If a safety brake 31 is not equipped with a locking function, the reset button 64 is pressed and held manually.

The safety brake 31 is then turned anticlockwise using the handwheel (arrow P9) until the locking tooth 33 of the locking disk 32 rests on the tooth flank 78 of the blocking body 66 (point P in FIG. 22).

The safety brake 31 is then turned 45° further anticlockwise using the handwheel (arrow P10) until the locking disc 32 and the control disc 34 are completely interlocked. The interlocking of locking disc 32 and control disc 34 is able to be seen in FIG. 23. The safety brake 31 noticeably engages in this position as well. The reset button 64 automatically springs back. In the case of a safety brake 31 without a latch function, the reset button 64 is released. The tension spring 65 pivots the reset button 64 back to its starting position according to the arrow P11. The safety brake 31 is now locked.

After a further rotation of a maximum of 45° anticlockwise, the catch hook 36 of the safety brake 31 would automatically take over the load. Further lowering is then no longer possible.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A lifting gear, comprising:
- a housing;
- a load chain wheel;
- a driveshaft configured to drive the load chain wheel via a transmission, wherein the load chain wheel and the driveshaft are rotatably supported in the housing;
- a load pressure brake;
- a safety brake comprising:
  - a locking disc with locking teeth,
  - a control disc with a plurality of control cams,
  - a catch hook, and
  - a spring element, wherein
  - the locking disc is rotatable relative to the control disc,
  - the catch hook comprises a latch contour at a front end of the catch hook, and a sensing contour at a rear end of the catch hook, and
  - the sensing contour rests under a spring force of the spring element on the control disc, and the latch contour is lockingly engageable with any one of the locking teeth of the locking disc; and
- an unlocking mechanism configured to return the locking disc and the control disc to a starting position, wherein the unlocking mechanism comprises a reset button and a blocking body, and
  - the blocking body is configured to be brought by actuation of the reset button into an unlocked position in which the locking disc is held by the blocking body in such a way that the control disc is rotatable relative to the locking disc, and the control disc and the locking disc are transferrable to the starting position.

2. The lifting gear according to claim 1, wherein
- the safety brake further comprises a rotation path limiter configured to limit a relative rotation of the locking disc and the control disk, and
- the rotation path limiter comprises at least one cam track, and a limit stop body displaceable along the at least one cam track.

3. The lifting gear according to claim 2, wherein the at least one cam track comprises an elongated hole or a groove in the control disc or the locking disc.

4. The lifting gear according to claim 2, wherein the limit stop body is a pin.

5. The lifting gear according to claim 1, wherein the safety brake further comprises latch elements incorporated between the locking disc and the control disc.

6. The lifting gear according to claim 1, wherein the locking teeth are evenly distributed on a circumference of the locking disc.

7. The lifting gear according to claim 1, wherein the plurality of control cams are evenly distributed on a circumference of the control disc.

8. The lifting gear according to claim 1, wherein the control disc comprises a central connector having an inner toothing, and the locking disc is positioned on the central connector with a central bearing section and is secured in position by a securing element.

9. The lifting gear according to claim 1, wherein in the starting position of the locking disc and the control disc, a rear outer contour of each of the locking teeth is aligned with an outer contour of the control disc.

10. The lifting gear according to claim 1, wherein the catch hook is mounted on a side plate of the housing.

11. The lifting gear according to claim 1, wherein the reset button is rotatably mounted.

12. The lifting gear according to claim 1, wherein the unlocking mechanism further comprises a tension spring configured to cooperate with the reset button.

13. The lifting gear according to claim 1, wherein the reset button and the blocking body form a unit.

14. The lifting gear according to claim 1, wherein the unlocking mechanism further comprises a latch configured to secure the reset button or the blocking body in the unlocked position.

15. The lifting gear according to claim 14, wherein the latch of the unlocking mechanism comprises a latch body, which, in the unlocked position, is engageable with a latch receptacle, wherein the latch body is moveable out of the latch receptacle in the starting position of the locking disc and the control disc.

16. The lifting gear according to claim 1, wherein the blocking body has an abutment surface on which the locking disc is supported in the unlocked position with an outer flank of any one of the locking teeth.

17. The lifting gear according to claim 1, wherein the blocking body has a tooth contour with a tooth flank configured to engage with any one of the locking teeth of the locking disc.

18. The lifting gear according to claim 1, wherein the lifting gear is a lever hoist.

19. The lifting gear according to claim 1, wherein the load chain wheel is configured to move a load chain.

20. The lifting gear according to claim 1, wherein the catch hook is arranged to be moveable in a swiveling manner.

* * * * *